United States Patent
Krause et al.

(10) Patent No.: US 9,568,341 B2
(45) Date of Patent: Feb. 14, 2017

(54) POSITION SENSOR

(75) Inventors: Norbert Krause, Eisenach (DE);
Stephan Gaertner, Pforzheim (DE);
Frank Weishaeutel, Wangenheim (DE);
Jens Hoffmann, Stuttgart (DE); Vahid Seyed-Khoei, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 546 days.

(21) Appl. No.: 13/514,280

(22) PCT Filed: Oct. 11, 2010

(86) PCT No.: PCT/EP2010/065175
§ 371 (c)(1),
(2), (4) Date: Aug. 10, 2012

(87) PCT Pub. No.: WO2011/069712
PCT Pub. Date: Jun. 16, 2011

(65) Prior Publication Data
US 2012/0306479 A1 Dec. 6, 2012

(30) Foreign Application Priority Data

Dec. 8, 2009 (DE) .................. 10 2009 047 621

(51) Int. Cl.
*G01B 7/14* (2006.01)
*G01D 11/24* (2006.01)
(Continued)

(52) U.S. Cl.
CPC .......... *G01D 11/245* (2013.01); *F16H 59/105* (2013.01); *F16H 61/0006* (2013.01);
(Continued)

(58) Field of Classification Search
CPC .......... G01C 1/00; G01C 22/00; G01C 23/00; G01C 5/00
(Continued)

(56) References Cited

U.S. PATENT DOCUMENTS 4,466,189 A * 8/1984 Tobin, Jr. .................. G01C 1/00
250/231.14
5,922,953 A * 7/1999 Payne et al. ..................... 73/494
(Continued)

FOREIGN PATENT DOCUMENTS

CN 1879217 12/2006
CN 1947315 4/2007
(Continued)

OTHER PUBLICATIONS

International Search Report for PCT/EP2010/065175, dated Dec. 6, 2011.
(Continued)

*Primary Examiner* — Jermele M Hollington
*Assistant Examiner* — Temilade Rhodes-Vivour
(74) *Attorney, Agent, or Firm* — Norton Rose Fulbright US LLP; Gerard Messina

(57) ABSTRACT

A position sensor has at least one guide rail for a guide housing having a magnetic component. On the guide housing, an encapsulation is accommodated which electrically insulates and/or fixes a lead frame assembly and/or a circuit trace assembly. It forms a retainer for the magnetic component.

8 Claims, 4 Drawing Sheets

(51) Int. Cl.
*F16H 59/10* (2006.01)
*G01C 1/00* (2006.01)
*G01C 5/00* (2006.01)
*G01C 22/00* (2006.01)
*F16H 61/00* (2006.01)

(52) U.S. Cl.
CPC ............... *G01C 1/00* (2013.01); *G01C 5/00* (2013.01); *G01C 22/00* (2013.01); *Y10T 29/49007* (2015.01)

(58) Field of Classification Search
USPC .............. 324/207.11, 206, 207.13, 207.2, 207.21, 324/207.22, 207.23, 207.24, 207.25, 207.26, 324/256, 257, 259, 260
See application file for complete search history.

(56) References Cited

U.S. PATENT DOCUMENTS

| | | | | |
|---|---|---|---|---|
| 6,366,194 | B1* | 4/2002 | Riehl | G01D 11/245 338/221 |
| 6,400,046 | B1* | 6/2002 | Hwang | H02K 11/01 310/12.19 |
| 6,412,182 | B1* | 7/2002 | Reichl | G01D 5/145 33/1 PT |
| 6,683,544 | B2* | 1/2004 | Tokunaga et al. | 341/15 |
| 7,725,231 | B2* | 5/2010 | Stolz | B60J 7/0573 296/216.01 |
| 9,222,807 | B2* | 12/2015 | Calandrini | G01D 18/002 |
| 2002/0047704 | A1* | 4/2002 | Apel | 324/207.2 |
| 2005/0007101 | A1* | 1/2005 | Fahrlander et al. | 324/207.2 |
| 2006/0028202 | A1* | 2/2006 | Terasaki | F15B 15/2807 324/207.21 |
| 2006/0082361 | A1* | 4/2006 | Hino | B62K 23/04 324/207.2 |
| 2008/0309324 | A1* | 12/2008 | Stuve | G01R 33/07 324/207.2 |
| 2009/0051352 | A1* | 2/2009 | Hoskins | B62D 15/021 324/207.2 |
| 2009/0051356 | A1* | 2/2009 | Nishide | G01B 7/023 324/207.26 |
| 2009/0240858 | A1* | 9/2009 | Takebayashi | B62M 25/08 710/110 |
| 2010/0201356 | A1* | 8/2010 | Koller et al. | 324/252 |

FOREIGN PATENT DOCUMENTS

| | | |
|---|---|---|
| DE | 199 55 603 | 2/2001 |
| DE | 10 2006 059 741 | 7/2008 |
| JP | 62-142543 | 6/1987 |
| JP | 2004-210162 | 7/2004 |
| JP | 2004-336853 | 11/2004 |
| JP | 2005-234616 | 9/2005 |
| JP | 2005-338003 | 12/2005 |
| JP | 2006-109888 | 4/2006 |
| JP | 2009-168721 | 7/2009 |
| JP | 2009-204340 | 9/2009 |
| WO | WO 2005/122368 | 12/2005 |

OTHER PUBLICATIONS

"Sensoren im Kraftfahrzeug" (Sensors in the Motor Vehicle), Robert Bosch GmbH, Edition 2007, Fachwissen Kfz-Technik, Elektrik and Elektronik für Kfz, ISBN-10 3-7782-2031-4, pp. 136-138.

* cited by examiner

POSITION SENSOR

BACKGROUND OF THE INVENTION

1. Field of the Invention

The present invention relates to an electronic position sensor having a guide housing accommodating a magnetic component.

2. Description of the Related Art

Published German patent application document DE 10 2006 059741 A1 relates to a modularly developed sensor carrier design. The sensor carrier design includes at least one base housing and at least one sensor carrier module produced separately from it. The sensor carrier module is made of molding-compatible material, and is able to be fastened mechanically on the base housing of the sensor carrier construction.

For applications in a motor vehicle, especially for position sensors for a transmission control system, the sensors are installed in electronics modules, in an integrated manner. In automatic transmissions, for example, inserted sensors have to be designed for the demanding operating conditions that prevail there. They have to withstand environmental temperatures between −40° C. and +150° C., and also withstand aggressive environmental medium transmission oil (ATF=automatic transmission fluid), high mechanical stresses up to 30 g and have to resist metallic abrasion and particle formation in the transmission.

The resistance to media and temperatures in these applications is ensured by oil-resistant packaging of the electronics, as well as the use of high-temperature printed circuit boards. Different physical measuring principles are used, based on complex requirements from different transmission topologies as well as insertion space and functional requirements. Linear position detection may take place, for instance, based on Hall switches. In this connection, four digital Hall switches are used, which are positioned on a printed-circuit board, in such a way that they record the magnetic coding of a linearly displaceable, multi-polar permanent magnet. A magnetic slider is connected to the linearly operated selector slide, a hydraulic slide in the transmission control plate or a parking lock cylinder.

Besides the Hall switches, there are resistors located on the printed-circuit board for the implementation of diagnostic functions and EMV capacitors.

The sensor electronics are protected by a sealed, oil-resistant epoxy resin molding from the effects of transmission oil. In an automatic transmission having manual shifting, also referred to as M-shifting, the position sensor detects the positions of the selector slide P, R, N, D, 4, 3, 2, as well as the intermediate ranges. These are output to the transmission control in the form of a 4-bit code. For safety reasons, the coding of the position setting is performed in one step, that is, a bit change is always required up to the detection of a new position. Simple bit changes caused by a malfunction are able to be detected as faulty, using a plausibility observation. The design of such position sensors for transmission control is known from the publication "Sensoren im Kraftfahrzeug" (Sensors in the Motor Vehicle), Robert Bosch GmbH, Edition 2007, Fachwissen Kfz-Technik, Elektrik und Elektronik für Kfz, ISBN-10 3-7782-2031-4, pages 136-138.

BRIEF SUMMARY OF THE INVENTION

Following the design approach provided by the present invention, in place of an additional component, which represents the protection against loss for the magnetic slider, the encapsulation made of polyamide (PA) is designed as just this retainer. Consequently, the PA encapsulation is used both for sealing the sensor packages from transmission oil and as a retainer for the magnetic slider. Based on the selected material combination, the production of a guide housing from polyphenylene sulfide (PPS) as well as the production of the package seal from PA, a hook as a retainer, molded using PA, does not adhere to the guide housing that is made of PPS.

Using the embodiment of a position sensor provided according to the present invention, which is particularly used in a vehicle transmission provided with a transmission fluid (ATF=automatic transmission fluid), the number of components used and the production costs and the production time required for transmission control are able to be considerably reduced. While following the design approach provided according to the invention, by using a PA encapsulation, both the electrical design and connecting technology in the form of a lead frame or a flex foil, or even conductor traces pre-encapsulated with one another, and the positioning of a sensor package are fixed in their position. Furthermore, using the PA encapsulation, electrical insulation from one another is ensured, which particularly excludes short circuits because of contamination in the surrounding medium. Using ATF this is definitely the case, since the transmission fluid may contain metallic abrasions of moved components, such as toothed wheels and shafts, which may lead to the above-mentioned short circuits.

In one particularly advantageous refinement of a guide housing, which is used on the position sensor provided according to the present invention, an elastic latching hook may be attached to the PA encapsulation that covers the design technology and the connecting technology. This is extremely easy to implement from a standpoint of production engineering, in the case of a position sensor provided according to the present invention, by a guide housing made of plastic, using an extrusion method. The latching hook is an integral component of the PA encapsulation, and is therefore not a separate component, so that this also represents a favorable cost saving in the production of the position sensor provided by the present invention. This retainer, which is particularly developed as a latching hook, limits in an especially advantageous manner the lateral travel path of a magnetic component, such as of a magnetic slider having magnetized or magnetic properties. The magnetic slider is guided to be movable in the lateral direction, in guide rails or in guide ribs, on the side of the guide housing facing away from the design technology and connecting technology. Since the retainer, especially the latching hook, penetrates through an opening of the guide housing after the assembly of the PA encapsulation, the hook-shaped projection of the retainer projects into the plane of motion of the magnetic or magnetized component, and limits its lateral travel path.

In one especially advantageous manner, owing to the design approach according to the present invention, a window-shaped opening may be implemented in the guide housing which, on the one hand, is opposite the sensor package, which is executed integrally with the design technology and connecting technology in the form of a lead frame assembly and a printed circuit trace device, and on the other hand, on the other side of the guide housing, detects the lateral travel movement of the magnetic component developed as a magnetic slider.

In one prepackaging, i.e. an integral disposition of the sensor packages with the design and connecting technology in the form of a pre-encapsulated lead frame device or in the form of pre-encapsulated circuit traces, this preassembled component is mounted on the guide housing in such a way that the sensor package is opposite to the window on the guide housing. The premounted component made up of the sensor package and the lead frame assembly or the circuit trace device may particularly simply be clipped into the guide housing. After that, the PA encapsulation is performed on which, advantageously, snap-in elements made of plastic are developed, which simply and without the use of tools claw correspondingly configured openings in the guide housing after the plastic has hardened.

On point-shaped supports in the guide housing or positioning aids that are configured to be rib-shaped, there lies the sensor package in a mounted state at a well-defined distance with respect to the window-shaped opening in the guide housing, on whose opposite side the magnetic slider is situated, that is movable in the lateral direction.

The window on the guide housing in an advantageous manner favors the minimization of the air gap between the sensor package and the magnetic slider. The encapsulation, which is clipped together with the guide housing via suitably developed openings, is not used for sealing the sensor packages from the transmission fluid. The PA encapsulation which, in the mounted state on the guide housing of the position sensor, protects the design technology and connecting technology in the form of pre-encapsulated lead frame and pre-encapsulated circuit traces, is used to avoid short circuits due to metallic particles present in the transmission fluid. The PA encapsulation is also used for fixing the position of the sensor packages in the mounted state, as well as in response to occurring temperature fluctuations, and also in response to shaking stresses that of necessity come about in the operation of a motor vehicle.

The production of the position sensor provided according to the present invention takes place by making sensor housing 12 of PPS, which is a material that is able to be worked highly accurately, but is expensive. The function of the sensor housing lies in accommodating the remaining components, as well as in the exact guidance of the magnet over its service life. Into the sensor housing of PPS material, a pre-encapsulated lead frame assembly as well as a sensor package are clipped in. The sensor package is clipped into an opening 22. Such a premounted component is inserted into an injection molding die, and is encapsulated with another plastic material, which is preferably PA. During the encapsulating process of the premounted component, clutching elements 54 are created by which pre-encapsulated lead frame assembly 50 and premounted sensor package 56 are connected integrally with the guide housing. At the same time as the encapsulation, at least one hook-shaped projection 44 is created. Into the encapsulated component thus completed, the magnetic slider is mounted, displaceable in the lateral direction.

DETAILED DESCRIPTION OF THE INVENTION

Figure 1:
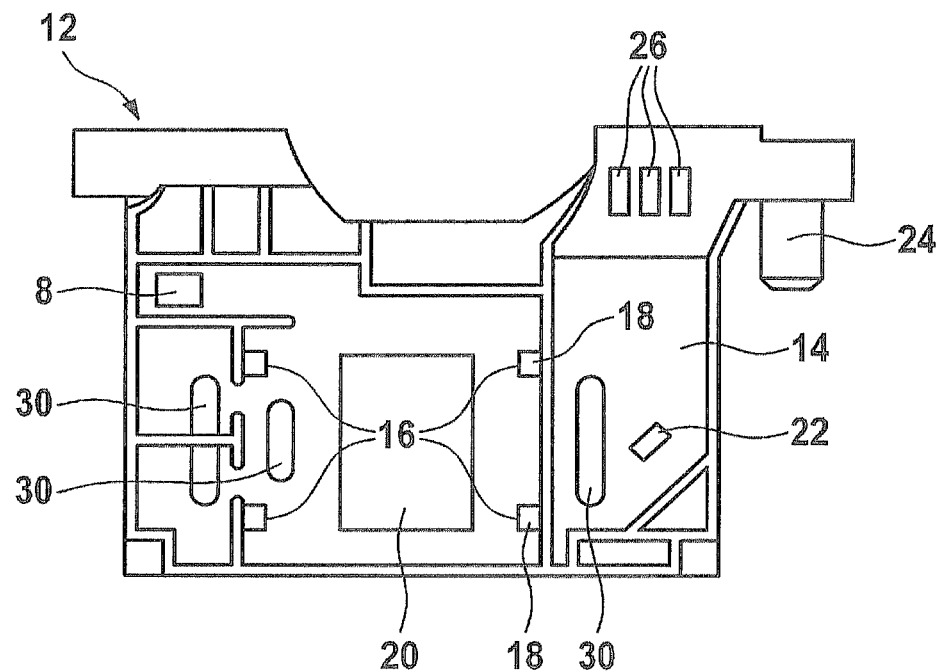
FIG. 1 shows a guide housing of the position sensor provided according to the present invention, having positioning aids for a sensor package as well as openings for clutching into a PA encapsulation of the guide housing that is to be applied later.

One may see in the illustration in FIG. 1 that a sensor housing 12 of a position sensor is developed as a guide housing 14. Guide housing 14 is made of plastic material, such as PPS, (GF+M)65 or PPS (GF+M)55. PPS is polypropylene sulfide, which represents a very costly plastic material, having very good properties, particularly with respect to its inherent stability over its service life. A PA encapsulation 48, as mentioned below, represents an encapsulation made of polyamide, which is a relatively favorable plastic material.

One may infer from the illustration of FIG. 1 that guide housing 14 of the position sensor has a number of openings developed in the shape of windows. Furthermore, a window 20 is developed in guide housing 14, within which, in the mounted state of the position sensor, a sensor package 56, still to be described, and a magnetic component 34, especially developed as a magnetic slider 34, that is laterally displaceable with respect to the former, lie opposite to each other. The configuration of window 20 in guide housing 14 permits the minimization of the distance between sensor package 56, cf. FIG. 5, and the magnetic slider, cf. the illustration according to FIG. 2.

Figure 5:
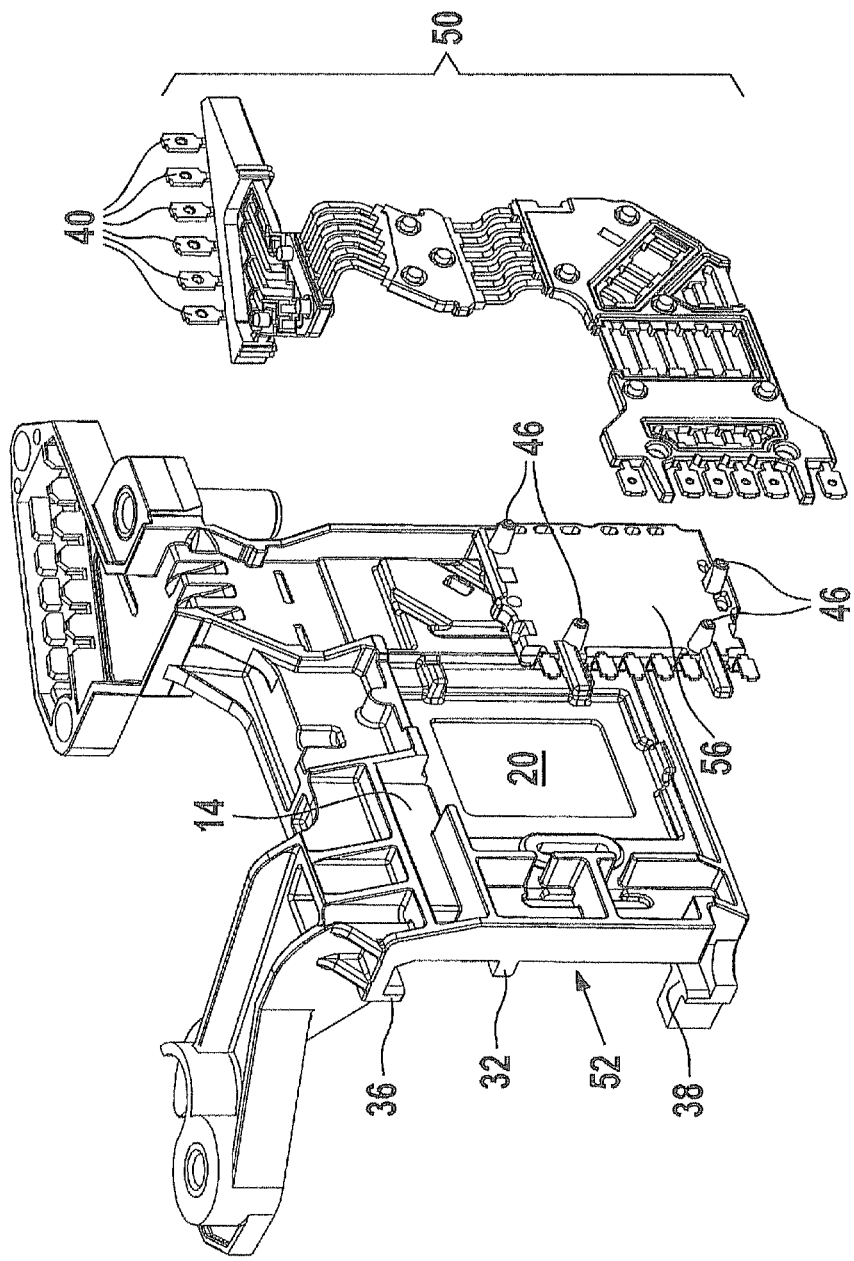
FIG. 5 shows the premounting of the sensor package and the lead frame and pre-encapsulated circuit trace assembly and their positioning with respect to the window on the guide housing.

In guide housing 14, there are positioning elements 16 which, for example, may be developed as ribs 18, or as point-shaped supports, against which sensor package 56 lies, cf. illustration according to FIG. 5, in the mounted state of same. Besides window 20 that has been mentioned, which is used to minimize the air gap between magnetic component 34 and sensor package 56, the housing includes a number of fastening windows or fastening openings 30. As indicated schematically in the illustration of FIG. 1, these are shaped like elongated holes. They could also have a square, rectangular or mushroom-shaped appearance, and they are used for the clutching of an encapsulation mass in an injection process with a PA encapsulation 48, according to the illustrations in FIGS. 3 and 6. Furthermore, in guide housing 14 of sensor housing 12 a window 28 is located, as in the illustration according to FIG. 1. It is used for the realization of a loss protection, as will be shown in greater detail below. Guide housing 14 also includes a flange bushing 24. Flange bushing 24 positions sensor housing 12. In addition, flange bushing 24 ensures the possibility of screwing in sensor housing 12, since it is able to include an inside thread. Furthermore, a window 22 is located in guide housing 14. This is used for latching a premounted assembly, a pre-encapsulated lead frame 50, cf. according to FIG. 5 a pre-encapsulated circuit trace device 40 or including another design technique and connecting technique. At window 22, a premounted assembly made up of design technique and connecting technique and sensor package 56 may be clipped on before a PA encapsulation 48, shown in FIG. 3, is produced.

Figure 2:
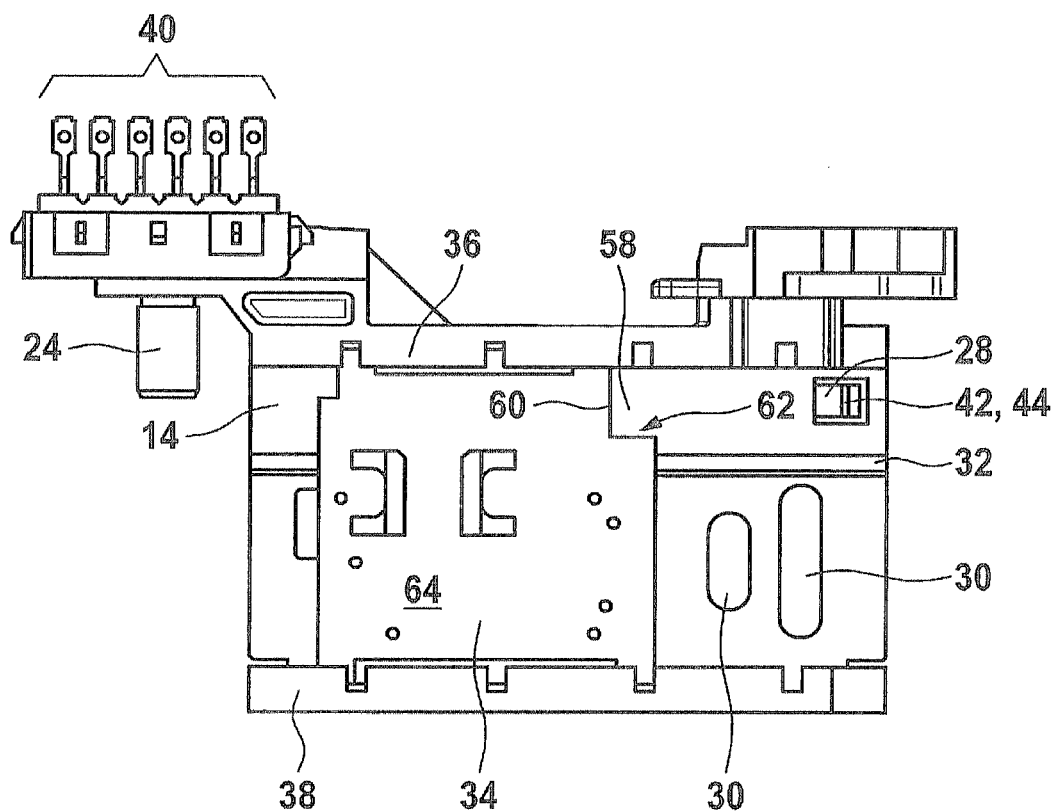
FIG. 2 shows the opposite side of the guide housing shown in FIG. 1, having guide rails and a magnetic component accommodated on a guide rib, developed in this case as a guide slider and already mounted electrical design technology and connecting technology.

FIG. 2 shows the finished assembly, the guide housing shown schematically in FIG. 1, from the opposite side.

On the rear of guide housing 14, shown in FIG. 2, there is a magnetic or magnetizable component 34 that is able to be moved in the lateral direction. In the specific embodiment according to FIG. 2, it is developed in the form of a slider and is able to be moved laterally on a guide rib 32, which is molded on on the back of guide housing 14. Opposing ends of magnetic component 34 are guided in a first guide rail 36 or a second guide rail 38, which are developed on guide housing 14. Magnetic component 34 includes a recess 58, which is limited by a stop face 60 at a side surface 32 of magnetic component 34. Stop face 60 collaborates with a retainer 42, 44 which, when PA encapsulation 48 is finished, cf. FIG. 3, penetrates through window 28, developed in guide housing 14 as a latching hook. Projection 44 projecting into the plane of motion of laterally movable component 34 of retainer 42 borders on the lateral path of motion of magnetic component 34 on guide housing 14. From the representation according to FIG. 2, it is also revealed that at one end of guide housing 14, in the mounted state of the design technique and connection technique in the form of pre-encapsulated circuit traces 40 and a pre-encapsulated lead frame assembly 50, circuit trace ends for contacting via just that guide housing 14 of the position sensor project outwards. FIG. 3 shows the orientation of the guide housing, however, with inserted sensor package and the PA encapsulation clipped in.

Figure 3:
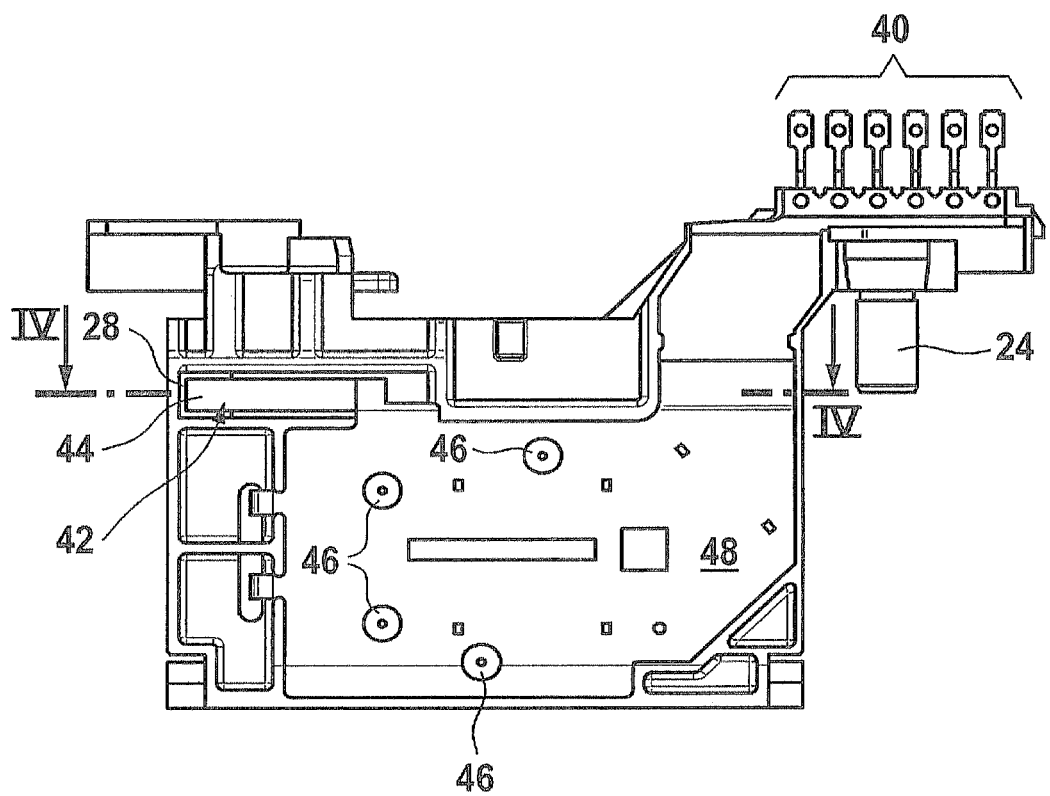
FIG. 3 shows the finished encapsulated component.

FIG. 3 shows that PA encapsulation 48 is ready encapsulated on guide housing 14. Reference numerals 46 denote the support points on which a sensor package 56 is accommodated that is situated at a well-defined distance with respect to lead frame assembly 50 and pre-encapsulated circuit traces 40. The PA encapsulation has on its side, not shown in FIG. 3, that faces guide housing 14, a number of snap-in elements 54, which are recognizable best in the exploded representation according to FIG. 6. It may be inferred from FIG. 3 that on PA encapsulation 48 a retainer 42 in the form of a latching hook 44 is developed, which is clutched in window 28 of PA encapsulation 48, and which in connection with FIG. 2 forms an already described retainer for the magnetic component. The clutching effect is created by the merging of the PA plastic material into window-shaped opening 28 provided for this.

One may see from the representation in FIG. 3 a sectional curve IV-IV, which runs through retainer 42, guide housing 14 and PA encapsulation 48.

Figure 4:
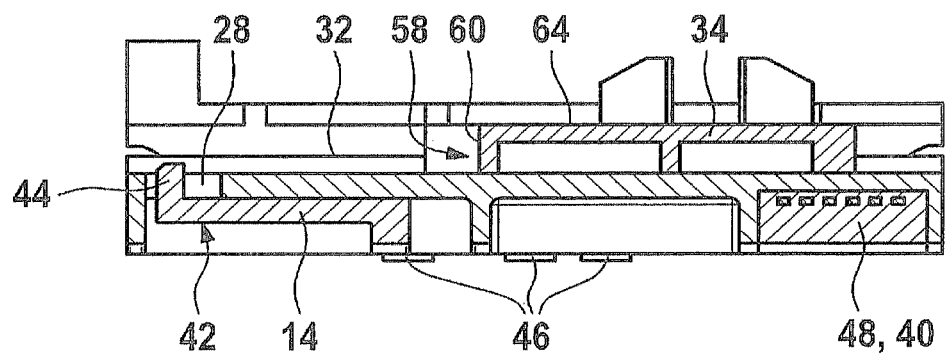
FIG. 4 shows a sectional profile, according to sectional profile IV-IV shown in FIG. 3, through the mounted arrangement of magnetic slider, guide housing and PA encapsulation according to FIG. 3.

FIG. 4 shows sectional curve IV-IV according to the representation in FIG. 3 through the assembly, guide housing 14, PA encapsulation 48 and magnetic component 34. From the representation according to FIG. 4 one may see that, in the mounted state of pre-encapsulated lead frame assembly 50 and pre-encapsulated circuit trace assembly 40 and its encapsulation 48 with PA, retainer 42 projects through window 28 of guide housing 14. Hook-shaped projection 44 of retainer 42 is created thereby and acts together with stop face 60, which borders on recess 58 of magnetic component 34. Because of the stop of stop face 60 at projection 44 that projects into the plane of motion of magnetic component 34, the path of motion, running in the lateral direction along guide rib 32, of the magnetic, especially slider-shaped component 34 is limited. From the sectional representation of FIG. 4 it may also be seen that, based on the prolonged arm of retainer 42, the latter innately has an elasticity which simplifies the assembly and favors the functional capability. Reference numerals 46 designate support points 46 to which sensor package 56, according to the exploded representation in FIG. 5, is connected to pre-encapsulated lead frame assembly 50 and pre-encapsulated circuit trace device 40 in a continuous material manner.

From the sectional representation according to FIG. 4, it may also be seen that, in the finished state, pre-encapsulated circuit trace assembly 40 and a pre-encapsulated lead frame assembly 50 are fixed by the PA encapsulation 48. PA encapsulation 48, which fixes and electrically insulates the premounted assembly made up of sensor package 56, pre-encapsulated lead frame assembly 50 and/or pre-encapsulated circuit trace assembly 40, lies in a planar manner against guide housing 14, on whose back side, along guide rib 32, magnetic component 34, that is developed in the form of a slider, in particular, is able to be moved. From the exploded representation according to FIG. 5 one may see that a pre-encapsulated lead frame assembly 50 may include a number of circuit traces. The design technique and connecting technique, instead of a pre-encapsulated lead frame assembly, may also include a number of circuit traces 40. FIG. 5 shows that, before the mounting of PA encapsulation 48, as shown in FIG. 3, sensor package 56 is electrically connected, at support points 46, to pre-encapsulated lead frame assembly 50 and a pre-encapsulated circuit trace assembly 40. Support points 46 are formed by peg-shaped projections rising from the back side of sensor package 56. The length of the peg-shaped projections in the region of support points 46 specifies the distance sensor package 56 takes up in the mounted state through window 20 with magnetic component 34 that is movable, according to FIG. 4 on the back side of guide housing 14, in the lateral direction. This air gap should be minimized. In the illustration according to FIG. 5, one may see from reference numeral 52 the assembly direction of magnetic component 34 according to the representation in FIG. 4 on guide rib 32 and guide rails 36 and 38 on guide housing 14 of the position sensor.

Figure 6:
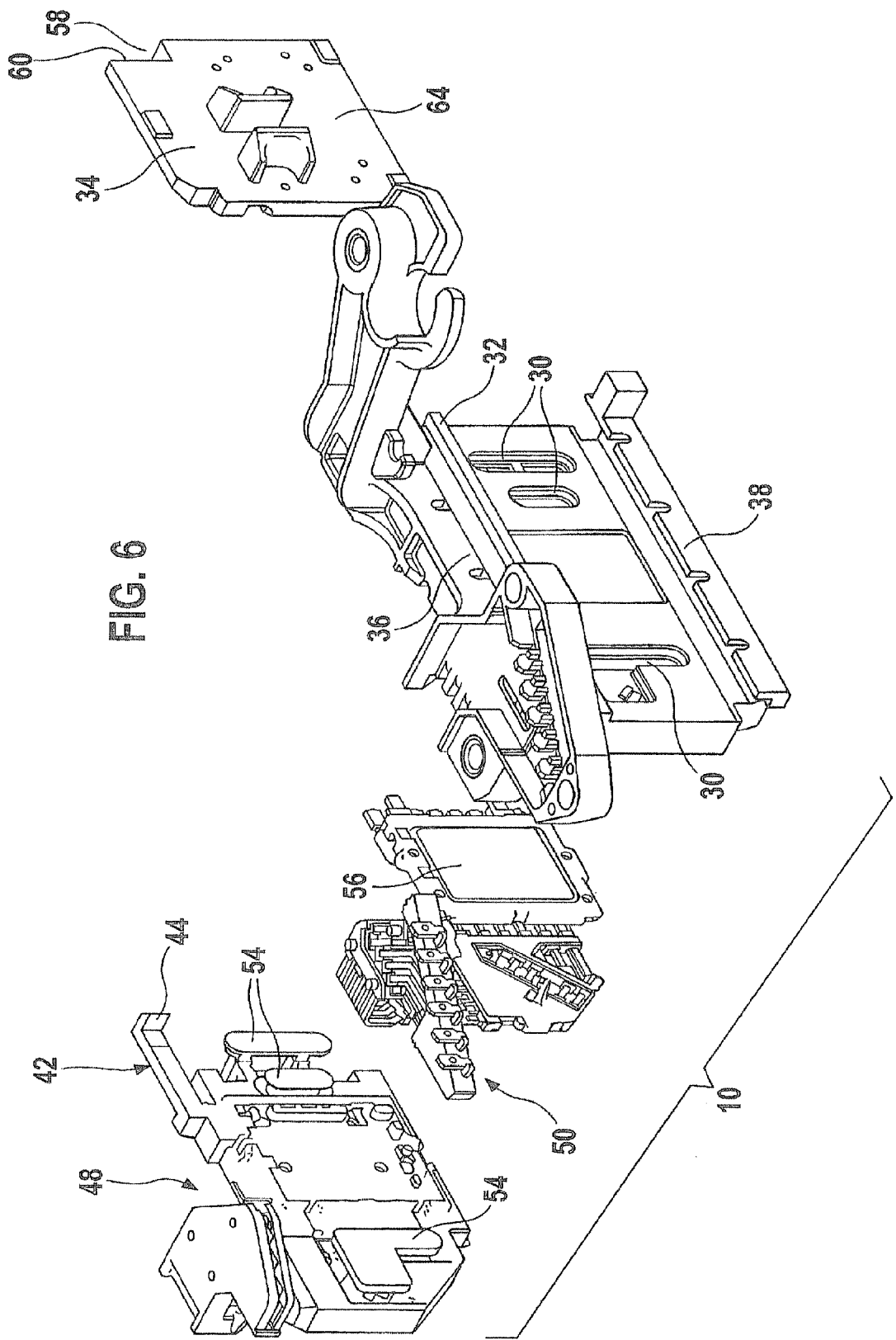
FIG. 6 shows an exploded representation of the components of the sensor provided according to the present invention, having a PA encapsulation, a premounted lead frame having a sensor package, a guide housing and a magnetic component still separated from it, in this instance, developed as a magnetic slider, in particular.

The exploded representation according to FIG. 6 shows position sensor 10, provided according to the present invention, in its individual assemblies.

In the representation according to FIG. 6, one may see sensor package 56, shown in FIG. 5 also in an exploded representation, which is connected in a continuous material manner with pre-encapsulated lead frame assembly 50 and a pre-encapsulated circuit trace assembly 40. This premounted assembly is first clipped to guide housing 14. The clipping takes place by the introduction of a snap-in element into window 22, shown in FIG. 1, of guide housing 14, so that the premounted assembly made up of sensor package 56, pre-encapsulated lead frame assembly 50 and pre-encapsulated circuit trace assembly 40 is fixed on guide housing 14. After that, there takes place the covering of this assembly by PA encapsulation 48. It may clearly be seen from the exploded view according to FIG. 6 that, on the inside of PA encapsulation 48, clutching elements 54 are developed mushroom-shaped as an undercut. These are produced during the production of PA encapsulation 48 on guide housing 14 by merging, and thereafter hardening PA material. In the production of PA encapsulation 48, sensor element 56 is pressed on with its front side to positioning elements 16, which may be configured as point-shaped rests or as a rib 18. In the assembly of PA encapsulation 48, hook-shaped projection 44 of retainer 42 projects through corresponding window 28 of guide housing 14. Then magnetic component 34 is pushed into lower guide rail 38, guide rib 32 possibly developed on the back side of guide housing 14, as well as into guide rail 36. Magnetic component 34 includes a front surface 64, a recess 58 that was mentioned in connection with FIG. 2, which is limited by stop face 60, as well as a side surface 62, which limit front surface 64 of magnetic component 34.

The pushing in of magnetic component 34 into guide rails 38 or 36 or guide rib 32 takes place particularly simply because, based on the chamfering of latching hook-shaped projection 44 in the push-in direction, the latter is able to be moved over particularly simply by magnetic component 34 that is movable in the lateral direction, but in the opposite direction, because of the straight running, hook-shaped projection 44 of retainer 42 stop face 60, which limits recess 58, stops at the straight side of hook-shaped projection 44 of retainer 42. For this reason, magnetic component 34, that is movable on guide housing 14 in the lateral direction, is accommodated with retainer, but in a movable manner.

What is claimed is:

1. A position sensor, comprising:
   a magnetic component;
   a guide housing accommodating the magnetic component, wherein the guide housing has at least one guide rail for movably guiding the magnetic component relative to the guide housing; and
   an encapsulation accommodated on the guide housing, wherein the encapsulation: (i) electrically insulates and fixes at least one of a lead frame assembly and a circuit trace assembly; and (ii) forms a retainer for the magnetic component, wherein the encapsulation has a hook-shaped projection as a part of the retainer, wherein the hook-shaped projection penetrates through a window in the guide housing, wherein the hook-shaped projection has a straight side and a chamfered side, and wherein the hook-shaped projection of the retainer projects into a plane of motion of the magnetic component and limits a lateral path of motion of the magnetic component.

2. The position sensor as recited in claim 1, wherein the guide housing has multiple openings, and wherein a plastic material forms a complementary fitting engagement with the multiple openings.

3. The position sensor as recited in claim 1, wherein the magnetic component is guided on a guide rib of the guide housing and on the at least one guide rail of the guide housing.

4. The position sensor as recited in claim 1, wherein the guide housing includes a window positioned opposite to a sensor package which is electrically connected to the at least one of the lead frame assembly and the circuit trace assembly.

5. The position sensor as recited in claim 1, wherein the guide housing includes an opening, and wherein the at least one of the lead frame assembly and the circuit trace assembly is latched into the opening.

6. The position sensor as recited in claim 1, wherein the guide housing includes positioning elements for a sensor package, and wherein the positioning elements are configured as ribs.

7. The position sensor as recited in claim 1, wherein the magnetic component includes a recess which is limited by at least one stop face.

8. A method for producing a position sensor having a guide housing which includes openings, the method comprising:
   a) forming an assembly by joining a sensor package contained in a continuous material to one of a pre-encapsulated lead frame assembly or a pre-encapsulated circuit trace assembly, by using support points provided on the sensor package;
   b) mounting a magnetic component on at least one of a guide rail and a guide rib of a guide housing, wherein the magnetic component is mounted movably relative to the guide rail;
   c) attaching, by a spraying process, an encapsulation to the formed assembly, wherein the encapsulation electrically insulates and fixes the formed assembly, wherein the encapsulation has clutching extensions which project into the openings of the guide housing; and
   d) snapping in a retainer into a window-shaped opening of the guide housing, wherein the retainer limits a lateral travel motion of the magnetic component relative to the guide housing, wherein the encapsulation has a hook-shaped projection as a part of the retainer, wherein the hook-shaped projection penetrates through a window in the guide housing, wherein the hook-shaped projection has a straight side and a chamfered side, and wherein the hook-shaped projection of the retainer projects into a plane of motion of the magnetic component and limits a lateral path of motion of the magnetic component.

* * * * *